(12) United States Patent
Jandhyala

(10) Patent No.: US 8,271,240 B2
(45) Date of Patent: Sep. 18, 2012

(54) SECURE CLOUD-BASED ELECTRONIC DESIGN AUTOMATION

(76) Inventor: Vikram Jandhyala, Seattle, WA (US)

( * ) Notice: Subject to any disclaimer, the term of this patent is extended or adjusted under 35 U.S.C. 154(b) by 212 days.

(21) Appl. No.: 12/859,531

(22) Filed: Aug. 19, 2010

(65) Prior Publication Data

US 2012/0046922 A1 Feb. 23, 2012

(51) Int. Cl.
*G06F 17/10* (2006.01)
(52) U.S. Cl. .......... 703/2; 703/14; 716/104; 702/64
(58) Field of Classification Search .......... 703/2, 13, 703/14; 716/104–118; 702/64–80, 189–199
See application file for complete search history.

(56) References Cited

U.S. PATENT DOCUMENTS

| | | | | |
|---|---|---|---|---|
| 6,513,001 | B1 * | 1/2003 | Kapur et al. | 703/13 |
| 7,127,688 | B2 * | 10/2006 | Ling et al. | 716/115 |
| 7,506,294 | B2 * | 3/2009 | Dengi et al. | 716/119 |
| 7,539,961 | B2 * | 5/2009 | Dengi et al. | 716/109 |

OTHER PUBLICATIONS

Coen et al, Automatic Equivalent Discrete Distributed Circuit Generation for Microstrip Interconnection Discontinuities, IEEE Antennas and Propagation Society International Symposium, 1994, pp. 1702-1705.*

Krupezevic et al, A Simplified 2D Graded Mesh FD-TD Algorithm for Calculating the Characteristic Impedance of Shielded or Open Planar Waveguides with Finite Metallization Thickness, IEEE MTT-S International Microwave Symposium, 1993, pp. 997-1000.*

Eberdt et al, A Multiresolution Impedance Method for Bioelectromagnetic Problems, IEEE Antennas and Propagation Society International Symposium, 2001, pp. 258-261.*

* cited by examiner

*Primary Examiner* — Russell Frejd
(74) *Attorney, Agent, or Firm* — The Webb Law Firm

(57) ABSTRACT

In a method of electronic design automation, discretized meshes of layers of current conducting materials of a computerized device model are determined. Each discretized mesh corresponds to the current conducting material of one model layer. For each discretized mesh, a corresponding impedance matrix having cells is determined. Each cell includes an impedance value $Z_{ij}$ which is based on a voltage ($V_i$) induced in a cell i of the discretized mesh due to a current ($I_j$) flowing in a cell j of the discretized mesh. A subset of the cells, including impedance values, of the impedance matrices is dispatched to node computers via an electronic communications network. In response to dispatching the cells of the impedance matrices, charge densities estimated by the node computers to exist on a subset of the cells of the discretized meshes are returned.

20 Claims, 9 Drawing Sheets

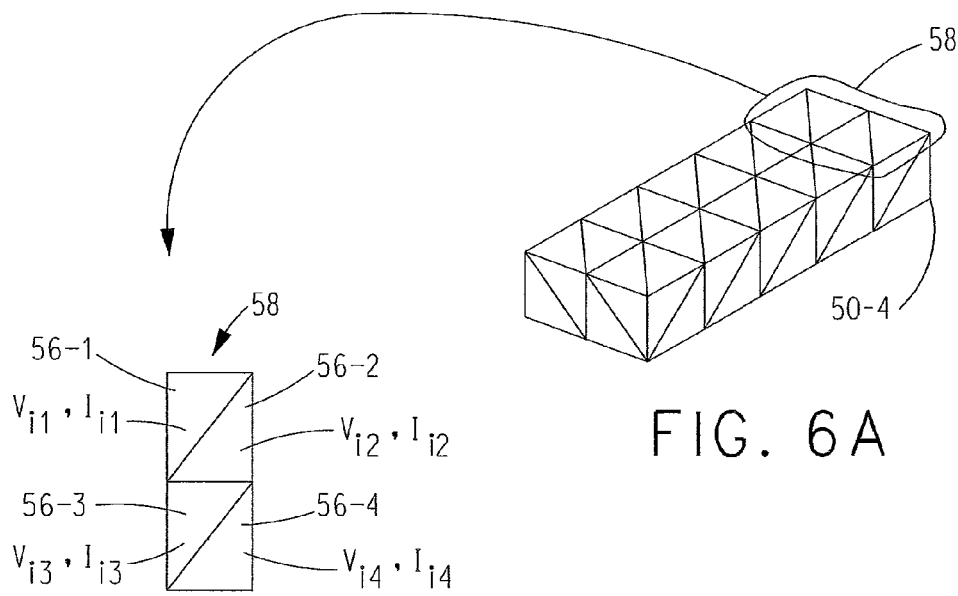
FIG. 6A
FIG. 6B
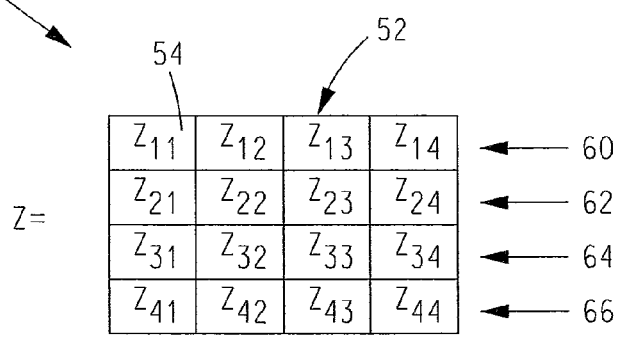
WHERE $Z_{ij}$ = IMPEDANCE(Z) DUE TO THE POTENTIAL V AT THE CENTER OF CELL $i$ DUE TO THE CHARGE DENSITY ON CELL $j$.
FIG. 6C
FIG. 6D $$\begin{bmatrix} Z_{11} & Z_{12} & Z_{13} & Z_{14} \\ Z_{21} & Z_{22} & Z_{23} & Z_{24} \\ Z_{31} & Z_{32} & Z_{33} & Z_{34} \\ Z_{41} & Z_{42} & Z_{43} & Z_{44} \end{bmatrix} \begin{bmatrix} I_1 \\ I_2 \\ I_3 \\ I_4 \end{bmatrix} = \begin{bmatrix} V_1 \\ V_2 \\ V_3 \\ V_4 \end{bmatrix}$$

$$(Z) \quad (I) = V$$

FIG. 7

$$I = \frac{V}{Z} = Z^{-1} V$$

FIG. 8A $$\begin{bmatrix} I_1 \\ I_2 \\ I_3 \\ I_4 \end{bmatrix} = Z^{-1} \begin{bmatrix} V_1 \\ V_2 \\ V_3 \\ V_4 \end{bmatrix}$$

FIG. 8B ated to exist on a subset of the cells of at least one discretized mesh; or (2) determining in cooperation with said node computer via the electronic communications network final charge densities or currents estimated to exist on a subset of the cells of at least one discretized mesh.

SECURE CLOUD-BASED ELECTRONIC DESIGN AUTOMATION

BACKGROUND OF THE INVENTION

1. Field of the Invention

The present invention relates to automated electronic design of devices, such as integrated circuits, integrated circuit packages, printed circuit boards, electrical connectors, aircrafts, automobiles, antennas, etc. and, more particularly, to automated electronic design of such devices utilizing a "cloud" computing network in a manner that maintains security of the device design.

2. Description of Related Art

The use of a "cloud" network, such as Amazon's EC2 or Microsoft's Azure for electronic design automation provides certain benefits, in conjunction with appropriate scalable algorithms, such as, without limitation, (i) scalability, i.e., availability of large amount of memory and a large number of computing resources and (ii) peak usage management, i.e., the computing resources can adapt to the needs of customers in terms of problem size. These benefits make the cloud network a favorable hardware platform on which to run electronic design automation (EDA) software.

However, there is one critical concern, namely, that of data security and intellectual property (IP) protection. In one example of this, companies that design integrated circuits are concerned that since the software is running on a computing cloud outside their company firewall, that sending critical IP is dangerous. Within EDA, critical IP includes layout (distribution of metal on chip in each layer) and stackup or technology information (the vertical distribution of metals and dielectrics materials and thicknesses) for chips, packages, boards, and systems.

One approach to reduce this problem is to encrypt the data going from such company's computer to the cloud. However, this approach has the following issues: (a) encryption can be costly and cause latency; (b) the encryption may be breakable; and (c) if the data has to be decrypted once on the cloud prior to EDA computation, then there is a concern that the cloud node may be accessed by an undesired third party thus compromising the IP.

SUMMARY OF THE INVENTION

The invention is a method of electronic design automation implemented by a processor of a computer comprising: (a) the processor determining for each of a plurality of layers of an analytical or computer model of a device residing in a memory accessible by the processor a discretized mesh of current conducting material of said layer; (b) the processor storing the discretized meshes determined in step (a) in said memory; (c) the processor determining for each discretized mesh stored in step (b) a corresponding or related impedance matrix having cells, wherein each cell of each impedance matrix includes an impedance value Zij which is based on a potential or voltage (Vi) induced in a cell i of the corresponding discretized mesh due to an initial charge density or current (Ij) determined to exist in a cell j of the corresponding discretized mesh in response to an exemplary bias applied to said discretized mesh; (d) the processor dispatching to each of a plurality of node computers on an electronic communications network a unique subset of the cells of the impedance matrices including the impedance values determined in step (c); and (e) responsive to the dispatching in step (d) to each node computer, the processor either: (1) receiving from said node computer via the electronic communications network final charge densities or currents estimated to exist on a subset of the cells of at least one discretized mesh; or (2) determining in cooperation with said node computer via the electronic communications network final charge densities or currents estimated to exist on a subset of the cells of at least one discretized mesh.

For each cell of each impedance matrix, $Z_{ij}$=voltage produced at cell i due to the unit current/charge density on cell j, with the voltages and currents/charge densities of all other cells set to zero, where i=1 ... n; j=1 ... n; and n=the number of cells.

All of the cells of the impedance matrices determined in step (c) can be dispatched to the plurality of node computers in step (d).

In step (d), each node computer can be dispatched a subset of the cells of one impedance matrix, wherein the subset of the cells of said one impedance matrix includes all or a portion of said cells of said one impedance matrix.

The final charge densities or currents estimated to exist on the subset of the cells of the at least one discretized mesh in step (e)(1) or step (e)(2) for each node computer can be determined based on the unique subset of impedance matrix cells dispatched to said node computer in step (d).

Step (d) can include dispatching two unique, non-overlapping sets of cells of one impedance matrix to two different node computers. The two unique sets of cells of the one impedance matrix can include two different rows or columns of said one impedance matrix.

The method can further include the processor dispatching to each of the plurality of node computers on the electronic communications network the voltage induced in each cell i of the corresponding discretized mesh related to the impedance values (Zij) included in the cells of the corresponding impedance matrix dispatched to said node computer.

The method can further include (f) the processor dispatching to each node computer via the electronic communications network a set of charge densities or currents estimated by the processor to exist in the cells of corresponding discretized mesh from which the impedance values of the impedance matrix cells dispatched to said node computer in step (d) were determined; and (g) the processor comparing potentials or voltages returned by the node computers that are based on the set of estimated charge densities or currents dispatched to said node computers in step (f) and the impedance matrix cells dispatched to said node computers in step (d) to the potentials or voltages determined to be induced in the discretized mesh cells in step (c), wherein each returned potential or voltage is related to a potential or voltage of one discretized mesh cell, and each returned potential or voltage is compared to the potential or voltage determined to be induced in the same discretized mesh cell in step (c).

The method can further include the processor deeming the sets of estimated charge densities or currents dispatched in step (f) to be the final charge densities or currents in step (e)(2) in response to the processor in step (g) determining that each returned potential or voltage is either equal to or is within a predetermined value of the potential or voltage determined to be induced in the same discretized mesh cell in step (c).

The method can further include the processor repeating steps (f) and (g) with at least one different set of estimated charge densities or currents substituted for at least one set of estimated charge densities or currents utilized in a prior iteration of step (f) in response to the processor in a prior iteration of step (g) determining that each returned potential or voltage is not equal to or is not within a predetermined value of the potential or voltage determined to be induced in the same discretized mesh cell in step (c).

Each different set of estimated charge densities or currents can cause the returned potentials or voltages to converge toward the potentials or voltages determined to be induced in the cells of the discretized meshes in step (c).

The device can be an integrated circuit, an integrated circuit package, a printed circuit board, an electrical connector, an aircraft, an automobile, or an antenna.

The impedance matrices determined in step (c) can include at least one compressed matrix determined via a fast multipole technique; a QR decomposition technique; a fast Fourier transform technique; or some combination of two or more of said techniques.

The invention is also a method of electronic design automation implemented by a processor of a computer comprising: (a) the processor determining discretized meshes of current conducting materials of layers of an analytical or computer model of a device residing in a memory accessible by the processor, wherein each discretized mesh corresponds to the current conducting material on one layer of the model; (b) the processor determining for each discretized mesh a corresponding or related impedance matrix having cells, wherein each impedance matrix cell includes an impedance value Zij which is based on a potential or voltage (Vi) induced in a cell i of the corresponding discretized mesh due to an initial current (Ij) determined to be flowing in a cell j of said corresponding discretized mesh in response to the application of an exemplary bias to said corresponding discretized mesh; (c) the processor dispatching to node computers via an electronic communications network a subset of the impedance matrix cells, including the impedance values, of the impedance matrices determined in step (b); and (d) in response to the dispatch in step (c) to each node computer the processor either: (1) receiving from said node computer via the electronic communications network final charge densities or currents estimated by said node computer to exist on a subset of the cells of the discretized meshes, or (2) determining in cooperation with said node computer via the electronic communications network final charge densities or currents that exist on a subset of the cells of the discretized meshes.

The subset of the impedance matrix cells dispatched in step (c) can include all of the cells of all of the impedance matrices, wherein each node computer in step (c) is dispatched a unique set of the impedance matrix cells that is non-overlapping with any other set of impedance matrix cells dispatched to any other node computer. The subset of the cells of the discretized meshes in either step (d)(1) or step (d)(2) can include all or a portion of the cells of one discretized mesh from which the impedance values of the impedance matrix cells dispatched to said node computer in step (c) were determined.

The method can further include dispatching to each node computer the voltages (Vi) induced in the discretized mesh cells corresponding to the impedance values Zij included in the impedance matrix cells dispatched to said node computer in step (c).

The method can further include: (e) the processor dispatching to each node computer a set of charge dendities or currents estimated to exist in the cells of the discretized mesh from which the impedance values of the impedance matrix cells that were also dispatched to said node computer in step (c) were determined; and (f) the processor comparing voltages returned by the node computers that are based on the set of estimated currents dispatched to said node computers in step (e) and the impedance matrix cells dispatched to said node computers in step (c) to the voltages determined to be induced in the discretized mesh cells in step (b), wherein each returned voltage is related to a voltage of one discretized mesh cell, and each returned voltage is compared to the voltage determined to be induced in the same discretized mesh cell in step (b).

The method can further include at least one of the following: in response to the processor in step (f) determining that each returned potential or voltage is either equal to or is within a predetermined value of the potential or voltage determined to be induced in the same discretized mesh cell in step (b), the processor deeming the sets of estimated charge densities or currents dispatched in step (e) to be the final charge densities or currents in step (d)(2); or in response to the processor in step (f) determining that each returned potential or voltage is not equal to or is not within a predetermined value of the potential or voltage determined to be induced in the same discretized mesh cell in step (b), the processor repeating steps (e) and (f) with at least one different set of estimated currents substituted for at least one set of estimated currents utilized in a prior iteration of step (e)

At least one impedance matrix determined in step (b) can be a compressed matrix determined via a fast multipole technique; a QR decomposition technique; a fast Fourier transform technique; or some combination of two or more of said techniques.

BRIEF DESCRIPTION OF THE DRAWINGS

FIG. 6A is an isolated perspective view of one of the discretized meshes shown in FIG. 5B;

FIG. 6B is an isolated plan view of four cells of the discretized mesh of FIG. 6A;

FIG. 6C is an illustration of an impedance matrix formed from the four cells of the discretized mesh shown in FIG. 6B;

FIG. 6D is an impedance matrix where the entries in the rows and columns of the impedance matrix of FIG. 6C are reversed;

FIG. 7 is an illustration of a matrix equation, wherein the impedance matrix Z of FIG. C is combined using matrix algebra techniques with a current matrix I, including values of $I_1$-$I_4$, to obtain a voltage matrix V, including values of $V_1$-$V_4$;

FIG. 8A illustrates manipulation of the matrix equation of FIG. 7, wherein the voltage matrix V multiplied by the inverse impedance matrix $Z^{-1}$ of FIG. 7 equals the current matrix I of FIG. 7;

FIG. 8B is an illustration of the matrix equation of FIG. 8A, wherein the full matrices for the current matrix I and the voltage matrix V have been substituted for 1 and V in FIG. 8A.

DETAILED DESCRIPTION OF THE INVENTION

The present invention will be described with reference to the accompanying figures where like reference numbers correspond to like elements.

Figure 1:
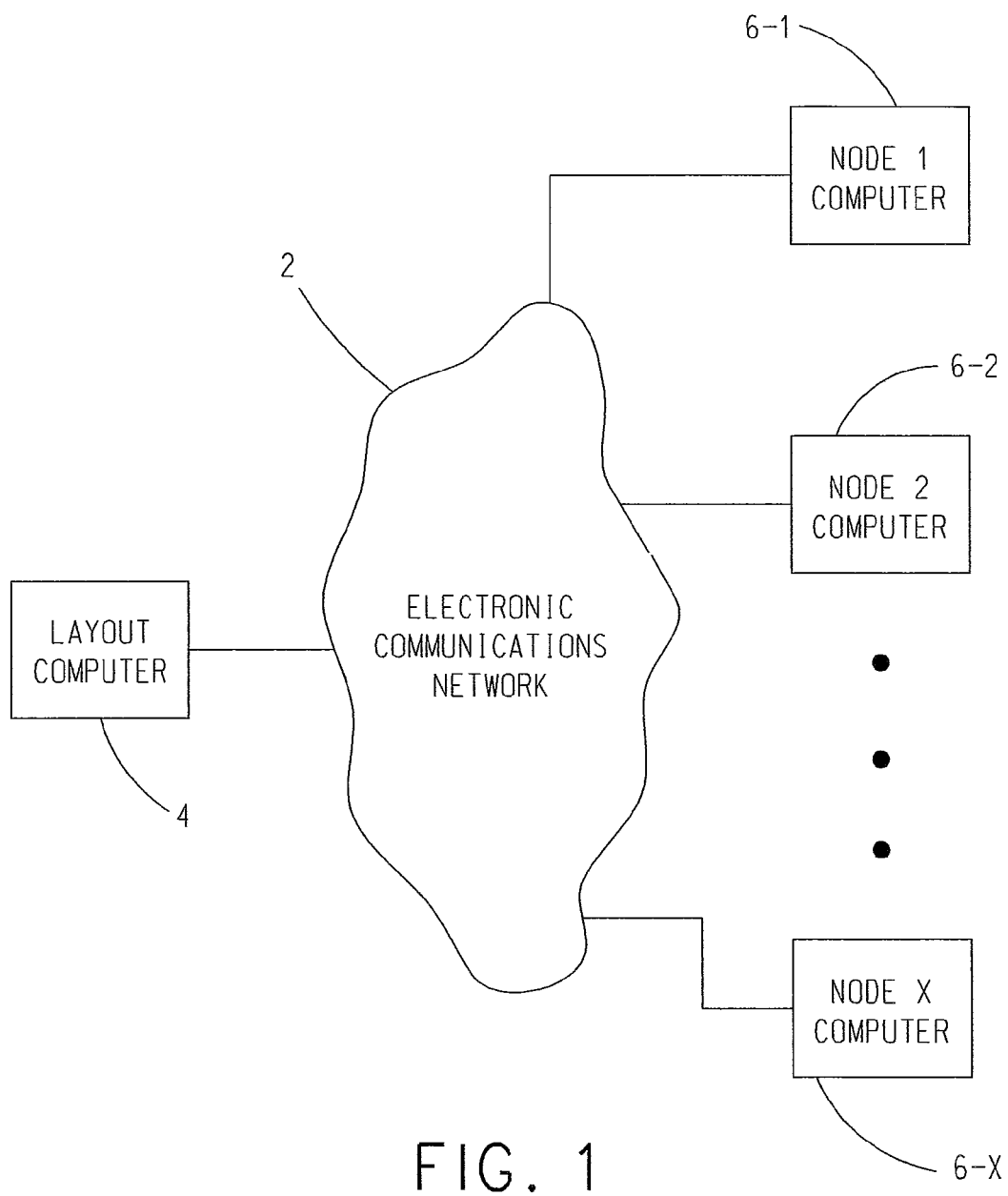
FIG. 1 is a schematic illustration of a layout computer connected to a cloud network that includes a number of node computers communicatively coupled to the layout computer via an electronic communications network, such as the Internet.

With reference to FIG. 1, in a so-called cloud computing environment where the present invention is realized, an electronic communications network 2 operatively and communicatively connects a layout computer 4 to a plurality of node computers 6. In FIG. 1, node computers 6-1, 6-2 . . . 6-X are illustrated. However, it is envisioned that any number of node computers greater than one node computer 6, e.g., two node computers, three node computers, four node computers, etc., can be utilized.

Desirably, FIG. 1 represents a "public cloud" wherein network 2 is the Internet and all of the node computers 6 utilized by layout computer 4 in the manner described herein are not owned and operated by the same entity. For example, each node computer is owned and operated by a separate entity; some portion of the node computers 6 utilized by layout computer 4 are owned by a common entity while the remaining node computers are owned by different entities; and so forth. This is in contrast to a "private cloud" wherein each node computer would be wholly owned and operated by a single entity. However, the description herein of FIG. 1 representing a "public cloud" is not to be construed as limiting the invention since it is envisioned that the cloud computing environment shown in FIG. 1 can comprise any suitable and/or desirable combination of a "public cloud" and/or a "private cloud".

Figure 2:
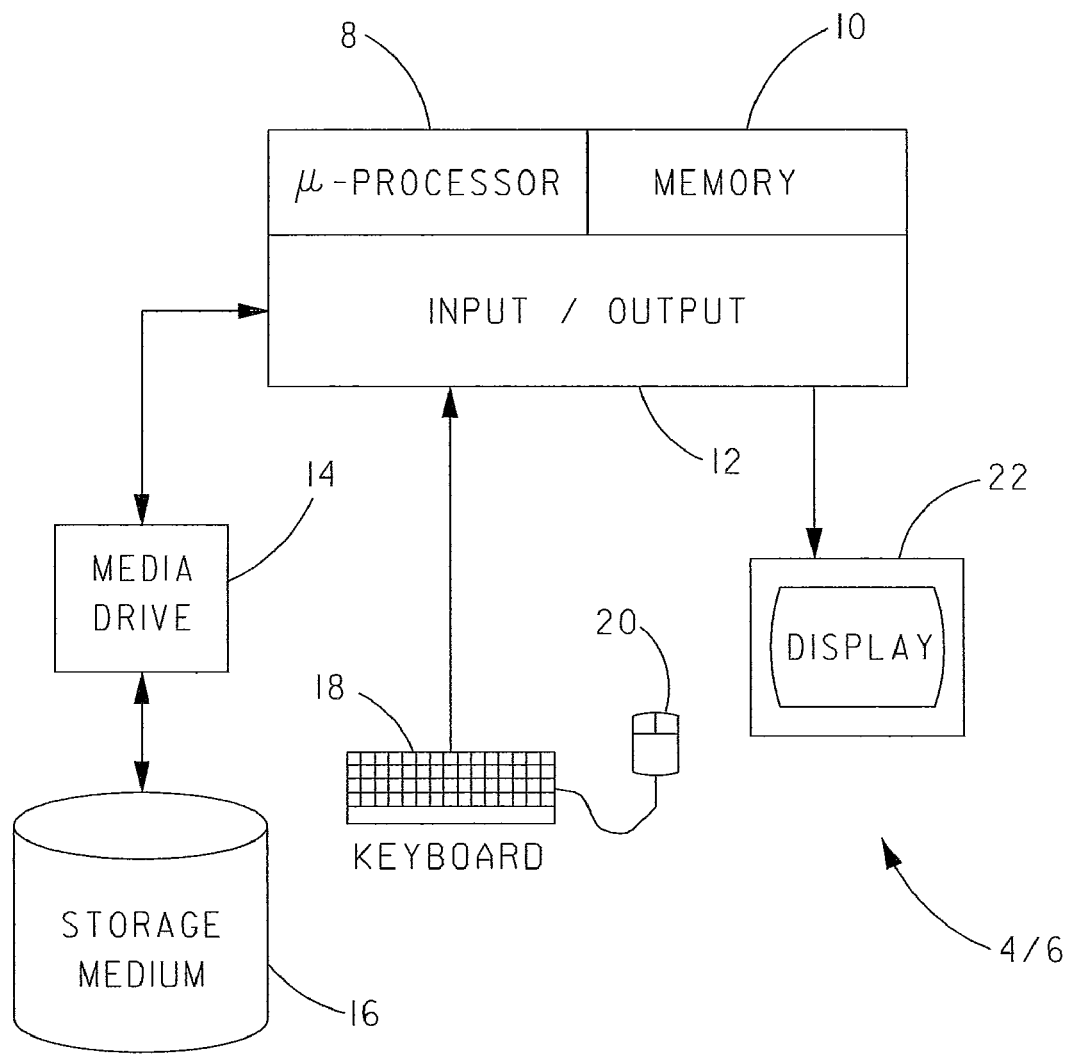
FIG. 2 is a block diagram of the hardware that can comprise each computer shown schematically in FIG. 1.

With reference to FIG. 2 and with continuing reference to FIG. 1, each computer 4 and 6 in FIG. 1 desirably includes a micro-processor 8, a computer memory 10, and an input/output system 12. Each computer can also include a media drive 14, such as a disc drive, a CD ROM drive, and the like. The micro-processor 8 of each computer can be operated under the control of computer readable program code that resides in computer memory 10, e.g., RAM, ROM, or EPROM, and/or on a computer readable storage medium 16 that is readable by media drive 14. Regardless of where it resides, the computer readable program code is able to configure and operate its respective computer in a manner to implement the present invention in the manner described hereinafter.

Input/output system 12 can include a keyboard 18, a computer mouse 16, and/or a display means 22, such as a video monitor, a printer, or any other suitable and/or desirable display means for providing a visually perceptible image. The computer illustrated in FIG. 2 is exemplary of a computer that can be utilized for each computer 4 and 6 shown in FIG. 1 and is, therefore, not to be construed as limiting the invention.

Figure 3:
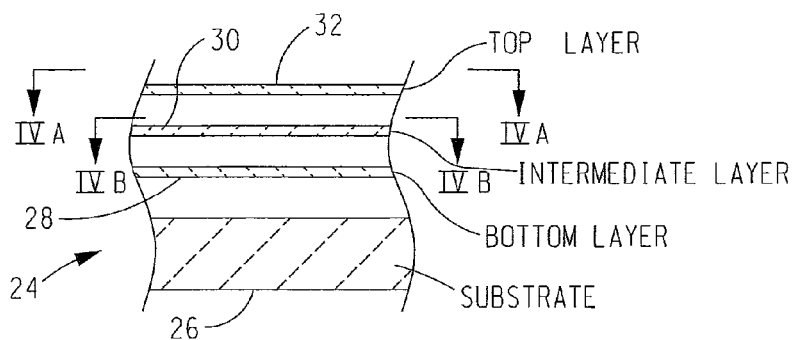
FIG. 3 is an exploded cross-sectional view of a device that includes a top layer which is atop an intermediate layer which is atop a bottom layer which is atop a substrate.

With reference to FIG. 3, a simplified embodiment of the present invention will now be described with reference to a multi-layer analytic or computer model of a device 24 that resides in memory 10 accessible by micro-processor 8 of layout computer 4. For the purpose of describing the present invention, device 24 will be described as being an integrated circuit. However, this is not to be construed as limiting the invention since device 24 can be an integrated circuit package, a printed circuit board, an electrical connector, an aircraft, an automobile, an antenna, or any other suitable and/or desirable device having two or more layers of conductive patterns separated from each other by an insulator and, possibly, connected to each other by way of conductive vias that extend through the insulator and connect one or more parts of the conductive pattern on one layer to one or more parts of the conductive pattern on another layer in a manner known in the art.

FIG. 3 is an exploded cross-sectional view of a portion of an integrated circuit that includes a semiconductor substrate 26, a bottom layer 28 disposed atop substrate 26, an intermediate layer 30 disposed atop bottom layer 28, and a top layer 32 disposed atop intermediate layer 30. In practice, in an unexploded version of device 24, top layer 32 is in contact with intermediate layer 30 which is in contact with bottom layer 28 which is in contact with substrate 26.

Figure 4A:
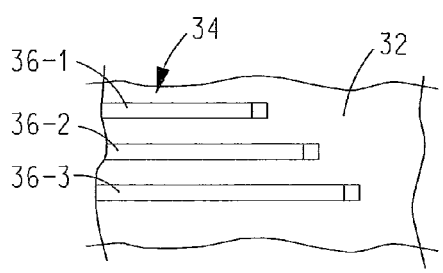
FIGS. 4A and 4B are views taken along lines IVA-IVA and IVB-IVB in FIG. 3 showing the conductors in each of the viewed layers.
Figure 4B:
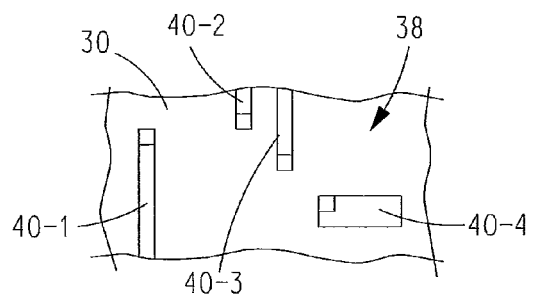

With reference to FIGS. 4A and 4B and with continuing reference to FIG. 3, top layer 32 includes a pattern of conducting material 34 shown in FIG. 4A as conductors 36-1-36-3. Similarly, intermediate layer 30 includes a pattern of conducting material 38 shown in FIG. 4B as conductors 40-1-40-4. Bottom layer 28 also includes a pattern of conducting material that is not shown for the purpose of simplicity.

Figure 5A:
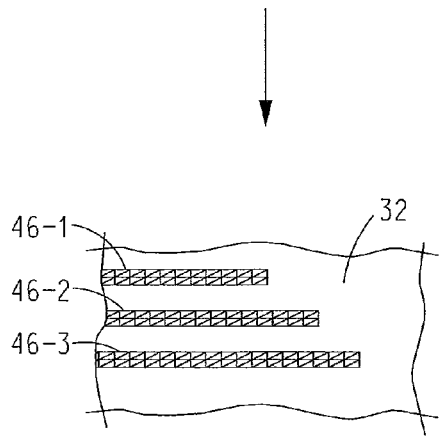
FIGS. 5A and 5B are illustrations of the conductors shown in FIGS. 4A and 4B, respectively, after discretizing into discretized meshes.
Figure 5B:
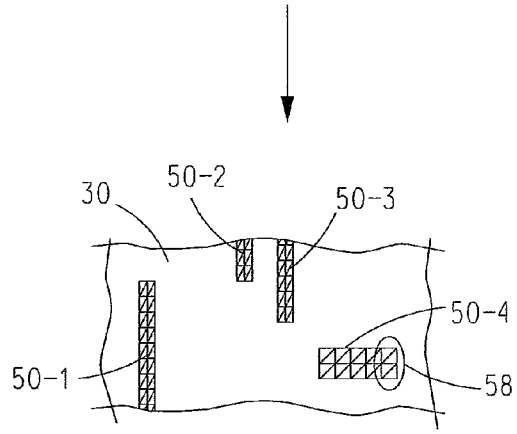
Figure 9A:
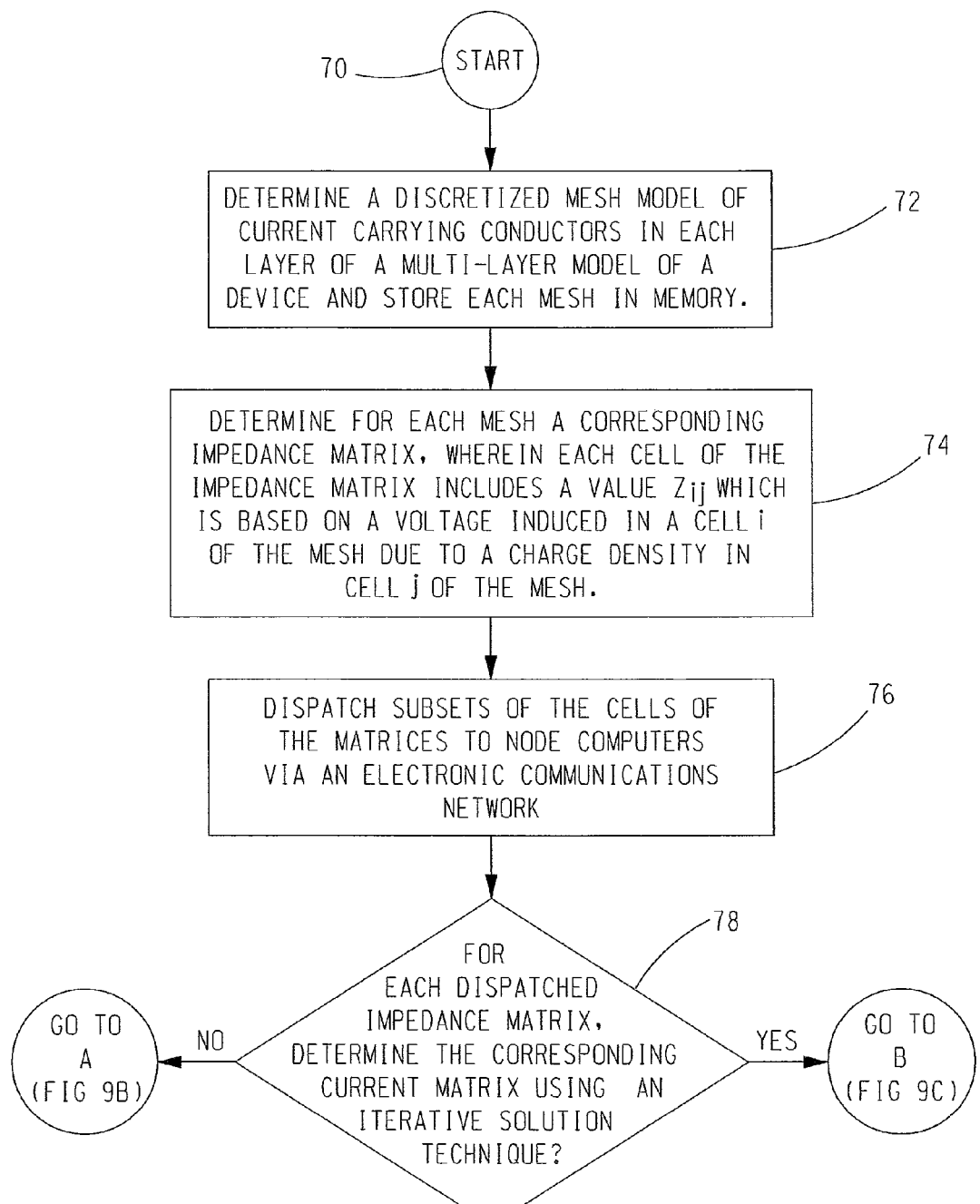
FIGS. 9A-9D are a flow chart of a method in accordance with the present invention.
Figure 9B:
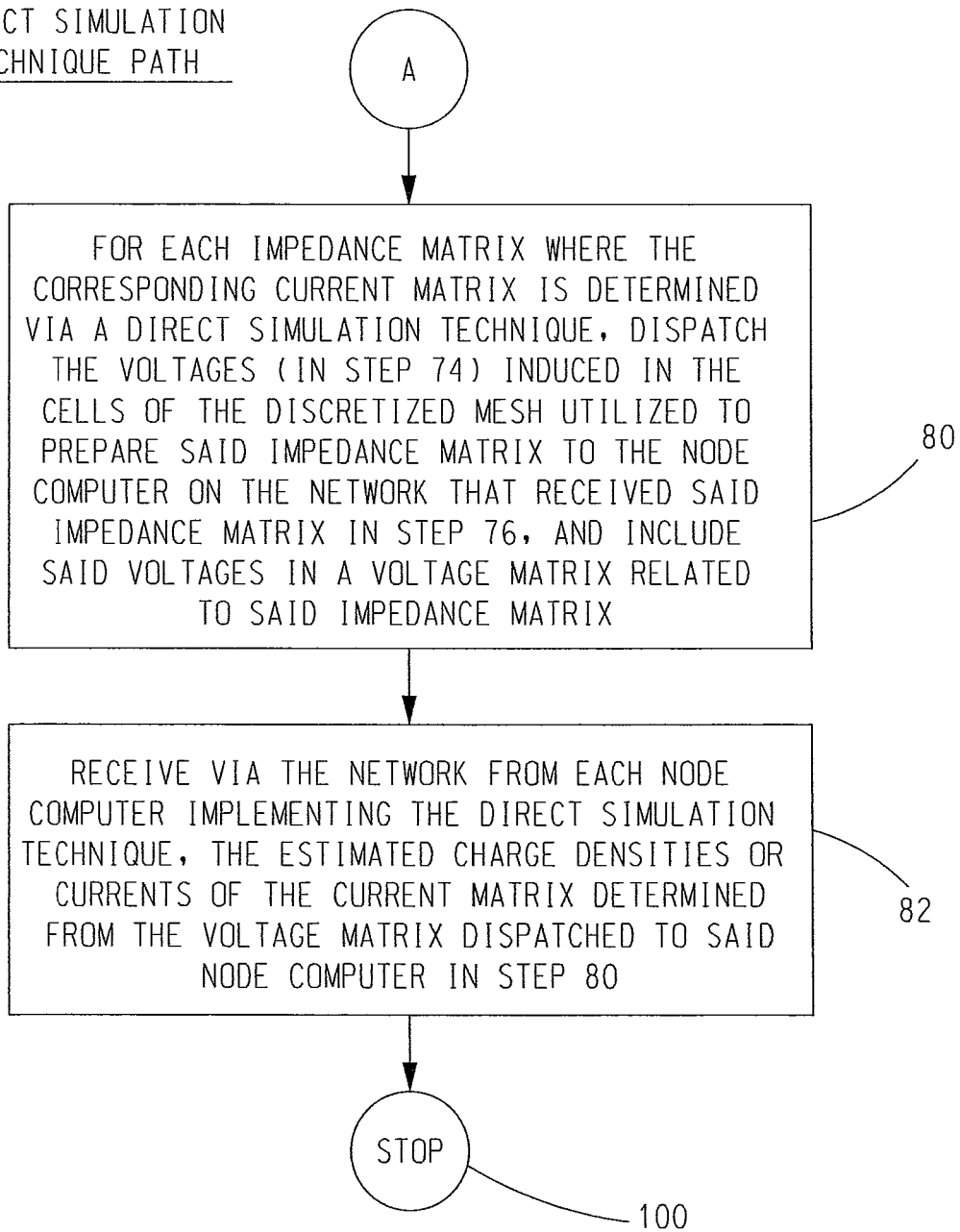
Figure 9C:
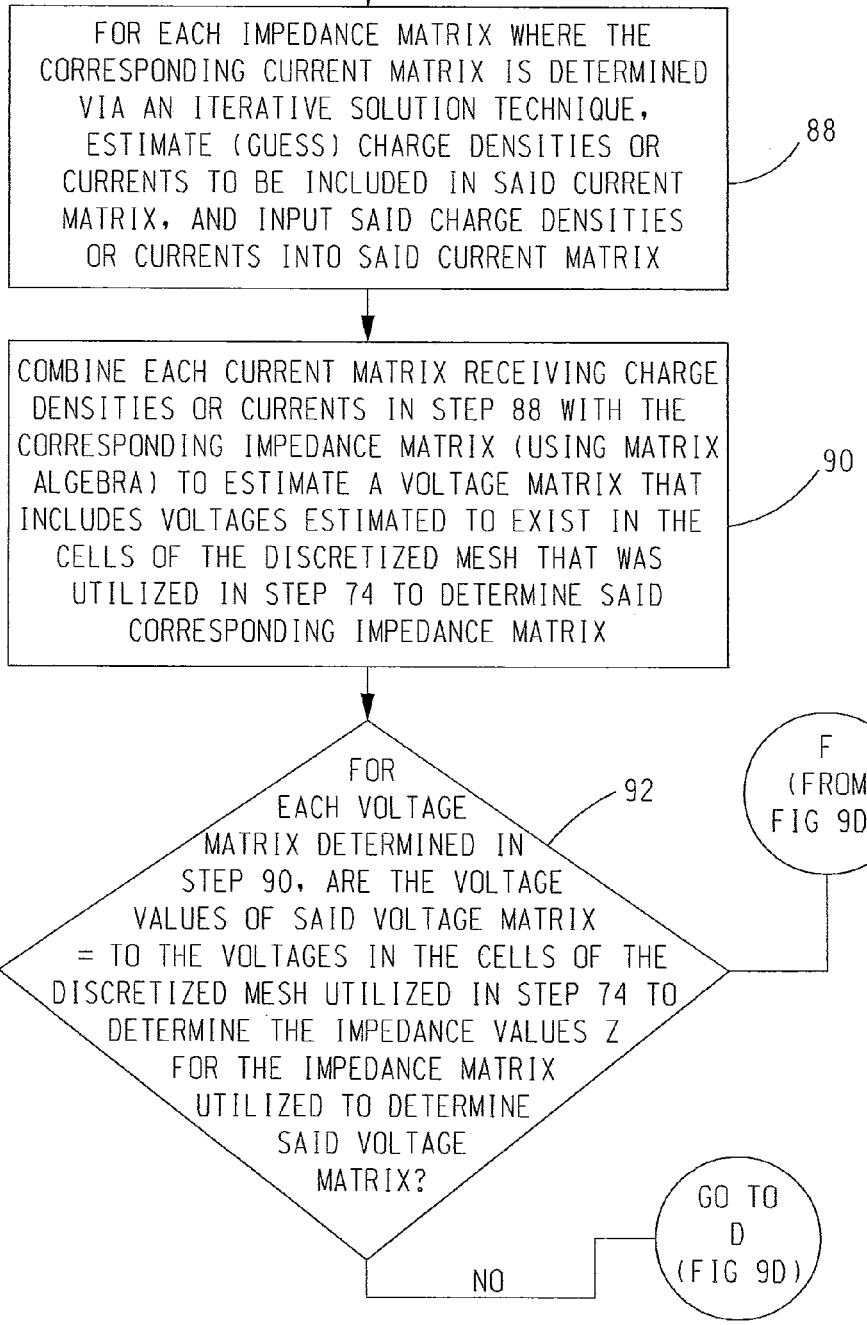
Figure 9D:
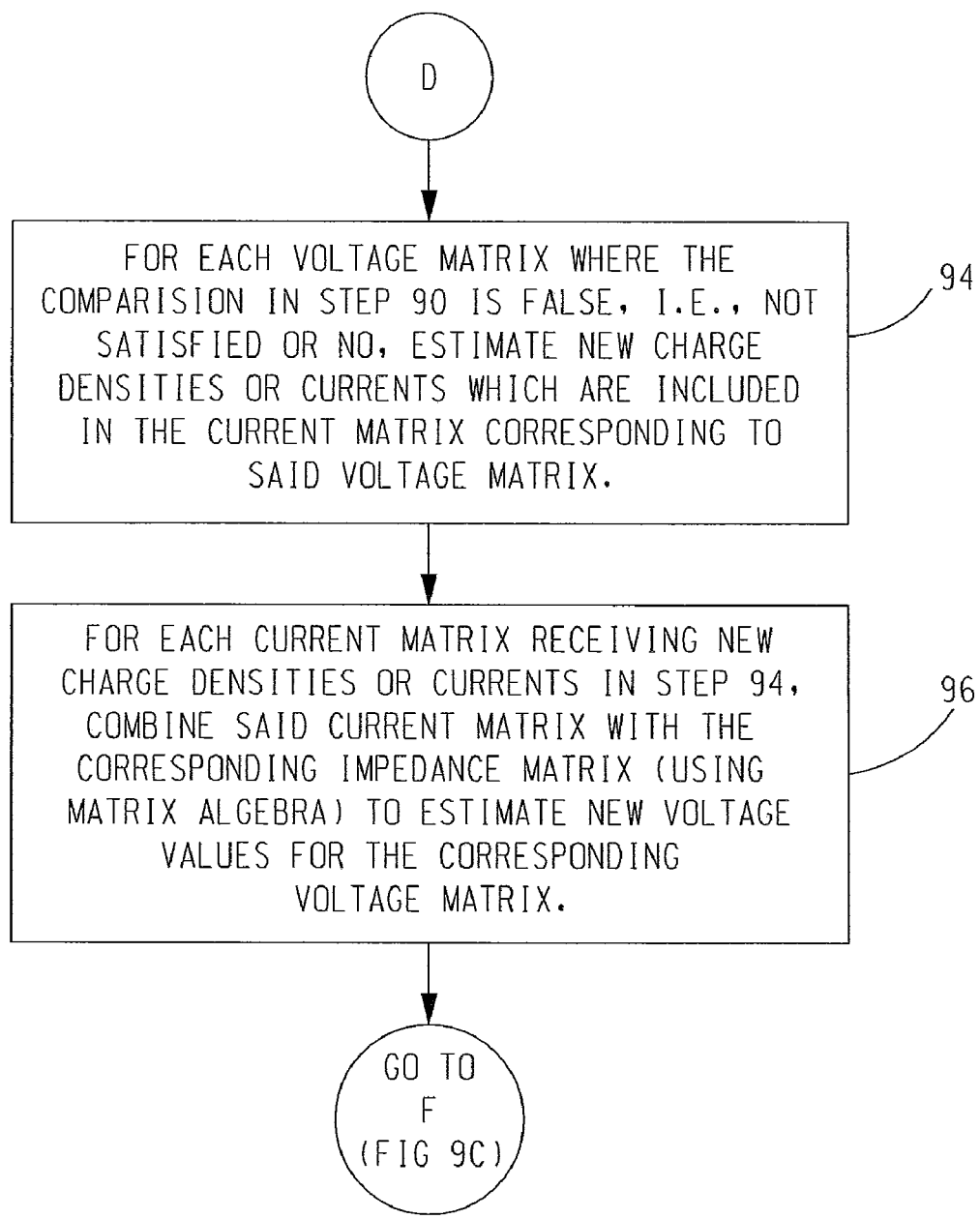

With reference to FIGS. 5A and 5B and with continuing reference to FIGS. 4A and 4B, the patterns of conducting materials 34 and 38 of device 24 reside in memory 10 accessible by micro-processor 8 of layout computer 4. At a suitable time, micro-processor 8 of layout computer 4 discretizes the conducting material 34 and 38 of each layer 32 and 30, while maintaining the spatial relationship of the conductors comprising the conducting material of each layer. More specifically, micro-processor 8 of layout computer 4 discretizes conductors 36-1 -36-3 and conductors 40-1-40-4 into discretized meshes 46-1-46-3 and 50-1-50-4, respectively, and stores each discretized mesh 46 and 50 in memory 10 of layout computer 4.

With reference to FIGS. 6A-6D and with continuing reference to FIGS. 5A and 5B, next, micro-processor 8 of layout computer 4 determines for each discretized mesh 46, 50 stored in memory 10 a corresponding or related impedance matrix 52 having cells 54. For the purpose of simplicity, the conversion of four cells 56-1-56-4 of discretized mesh 50-4 into impedance matrix 52 will be described. However, this is not to be construed as limiting the invention since it is envisioned that an impedance matrix, like impedance matrix 52, can be determined for the discretized meshes of each layer 28, 30, and 32 of device 24. For example, a unique impedance matrix can be determined for the discretized meshes 46-1, 46-2, and 46-3 of top layer 32, and a unique impedance matrix can be determined for the discretized meshes 50-1-50-4 of intermediate layer 30.

With continuing reference to FIGS. 6A-6D, for the purpose of describing the present invention, cells 56-1-56-4 of discretized mesh 50-4 can be thought of as defining a discretized mesh 58. The determination of impedance matrix 52 from discretized mesh 58 will now be described for the purpose of illustration. It is envisioned, however, that the principles to be discussed next are extensible to the determination of a discretized mesh for each layer 28, 30, and 32 of device 24.

Impedance matrix 52 includes an array of cells 54, each of which includes an impedance value $Z_{ij}$ which is due to the initial potential or voltage $V_i$ estimated to exist at the center of a cell i of discretized mesh 58 due to an initial unit charge density or current $I_j$ estimated to exist on cell j of discretized mesh 58. The initial potential or voltage $V_i$ and the initial charge density or current $I_j$ on each cell of discretized mesh 58 are exemplary values that are determined mathematically in a manner known in the art in response to the application of an exemplary, model bias to discretized mesh 58 stored in memory.

In the example of impedance matrix 52, the impedance values Z included in the first row 60 of impedance matrix 52 include, from left to right: impedance value $Z_{11}$ equal to the potential or voltage $V_1$ at the center of cell 56-1 due to the initial unit charge density or current $I_1$ on cell 56-1, i.e., $V_1/I_1$; impedance value $Z_{12}$ equal to the potential or voltage $V_1$ at the center of cell 56-1 due to the initial unit charge density or current $I_2$ on cell 56-2, i.e., $V_1/I_2$; impedance value $Z_{13}$ equal to the potential or voltage $V_1$ at the center of cell 56-1 due to the initial unit charge density or current $I_3$ on cell 56-3, i.e., $V_1/I_3$; and impedance value $Z_{14}$ equal to the initial potential or voltage $V_1$ at the center of cell 56-1 due to the initial unit charge density or current $I_4$ on cell 56-4, i.e., $V_1/I_4$.

In a similar manner, row 62 of impedance matrix 52 includes impedance values $Z_{21}$, $Z_{22}$, $Z_{23}$, and $Z_{24}$, where the subscripts 21, 22, 23, and 24 refer to the initial potential or voltage $V_2$ at the center of cell 56-2 due to the initial unit charge densities or currents $I_1$-$I_4$ on cells 56-1-56-4 of discretized mesh 58 respectively. In a similar manner, microprocessor 8 of layout computer 4 determines impedance values Z each for the cell 54 in rows 64 and 66 of impedance matrix 52.

The impedance values Z in each row of impedance matrix 52 are for the initial potential or voltage $V_i$ estimated to exist the center of a particular cell 56 due to initial charge densities or currents estimated to exist in all of the cells of discretized mesh 58. For example, row 60 of impedance matrix 52 includes impedance values due to the initial potential or voltage $V_1$ estimated to exist at the center of cell 56-1 due to initial unit charge densities or currents $I_1$-$I_4$ estimated to exist in cells 56-1-56-4. The layout of impedance matrix 52 is not to be construed as limiting the invention since it is envisioned that the impedances Z entered into the rows and columns of impedance matrix 52 can be reversed as shown in impedance matrix 52' shown in FIG. 6D.

The formation of impedance matrices from discretized meshes determined for the conductors of each layer of a device is well known in the art. Typically, one impedance matrix is determined for each layer of a multi-layer device. However, this is not to be construed as limiting the invention since it is envisioned that two or more impedance matrices may be formed for one or more layers of a multi-layer device.

Next, a unique subset of the cells of the impedance matrices including the impedance values are dispatched by layout computer 4 to a plurality of node computers 6 via network 2. In one non-limiting embodiment, the impedance matrix determined for each layer 28, 30, and 32 of device 24 is dispatched to a different node computer 6.

In another embodiment, one or more impedance matrices are subdivided into non-overlapping, unique sets of impedance matrix cells 54. Each unique set of impedance matrix cells 54 can then be dispatched to a different node computer 6. For example, without limitation, a first set of contiguous rows or columns of an impedance matrix, e.g., rows 60 and 62 of impedance matrix 52 in FIG. 6C, can be dispatched to a first node computer, e.g., 6-1, while a second, non-overlapping set of rows or columns of the same impedance matrix, e.g., rows 64 and 66 of impedance matrix 52, can be dispatched to a different node computer, e.g., 6-2. However, this is not to be construed as limiting the invention since it is envisioned each impedance matrix can be subdivided into any number of unique, non-overlapping sets of cells, wherein each of said set of cells is dispatched to a different node computer 6.

Each impedance matrix or portion thereof can be dispatched by layout computer 4 to a different node computer 6 for processing in a manner to be discussed hereinafter. Dispatching each impedance matrix or portion thereof to a unique node computer 6 on network 2 avoids the possible interception of critical data from which the layout of one or more of the layers of device 24 can be determined or extrapolated. This is because each impedance matrix, or portion thereof, does not include information regarding the physical geometry of the corresponding device layer or portion thereof.

Also or alternatively, two or more, but not all, of the impedance matrices determined for device 24 can be dispatched separately to the same node computer 6. In yet another embodiment, two or more non-overlapping sets of impedance matrix cells 54 can be dispatched to the same node computer 6 at different times. For example, two unique, non-overlapping sets of impedance matrix cells 54 can be dispatched at different times to the same node computer 6. In another example, one unique set or portion of the cells 54 of one impedance matrix and another unique set or portion of the cells of another impedance matrix can be dispatched to the same node computer 6 at different times. To this end, it is envisioned that a node computer 6 can receive at different times two or more impedance matrices or portions of one or more impedance matrices.

At a suitable time after each node computer 6 has received an impedance matrix or portion thereof from layout computer 4, an estimate of a final charge density or current ($I_f$) that exists or flows in each cell 56 of the corresponding discretized mesh 58 represented by the set of cells 54 of the impedance matrix 52 being processed by said node computer due to the initial potentials or voltages $V_i$ and the initial charge densities or currents $I_i$ estimated to exist in all of the cells 56 due to the application of the exemplary bias to the discretized mesh 58 is determined.

With reference to FIG. 7 and with continuing reference to FIGS. 6A-6D, simple, non-limiting examples of a node computer 6 processing impedance matrix 52 will now be described for the purpose of illustration. However, it is to be understood that the examples described herein for discretized mesh 58 and impedance matrix 52 are extensible to discretized meshes and impedance matrices of any size, e.g., an impedance matrix formed for all of discretized meshes 50-1-50-4 of layer 30.

Generally speaking, the goal of each node computer 6 receiving an impedance matrix, e.g., impedance matrix 52, is to either find or assist layout computer 4 find values of final charge densities or currents $I_{f1}$-$I_{f4}$ for the impedance values Z included in the cells of said impedance matrix. Each final charge density or current $I_f$ estimated to exist in each cell of a discretized mesh represents the contributions of the initial potentials or voltages $V_i$ and the initial charge densities or currents $I_i$ estimated to exist in each of the cells 56 of said discretized mesh. Thus, the goal is to determine the actual or final charge densities or currents $I_f$ that exist in each cell of the discretized mesh (or portion thereof) that was utilized to derive to the impedance matrix received by each node computer 6. The determination of the final charge densities or currents $I_f$ can be accomplished either via a direct simulation technique or an iterative solving technique.

In the direct simulation technique, layout computer 4 also dispatches to each node computer 6 the initial potentials or voltage $V_i$ at the centers of the cells of the discretized mesh that was utilized to derive the impedance matrix (or portion thereof) that layout computer 4 dispatched to said node computer 6. For example, assuming layout computer 4 dispatches impedance matrix 52 to a node computer 6, layout computer 4 will also dispatch to this same node computer 6 the initial potentials or voltages $V_{i1}$-$V_{i4}$ estimated to exist in cells 56-1-56-4 of discretized mesh 58. These dispatched potentials $V_{i1}$-$V_{i4}$ are arranged by the node computer 6 into a one dimensional voltage matrix 69.

Once impedance matrix 52 and voltage matrix 69 have been stored in the memory 10 of the node computer 6, the micro-processor 8 of said node computer 6 sets up the matrix equation shown in FIG. 7, wherein, the impedance matrix 52 multiplied by a current matrix 67 equals voltage matrix 69.

The setup and solution of the matrix equation shown in FIG. 7 is well known in the art and will not be described in detail herein for the purpose of simplicity.

Once the matrix equation of FIG. 7 has been formed in memory 10 of the node computer 6, the micro-processor 8 of said node computer 6 isolates the current matrix 67 on one side of the matrix equation by dividing both sides of the matrix equation of FIG. 7 by impedance matrix 52 as shown in FIG. 8A. Thereafter, as further shown in FIGS. 8A and 8B, the micro-processor 8 of said node computer 6 determines the inverse of impedance matrix 52, i.e., $Z^{-1}$ 52'. Thereafter, the micro-processor 8 of said node computer 6 sets up the equality shown in FIG. 8B, wherein the current matrix 67 is set equal to the product of the inverse impedance matrix $Z^{-1}$ 52' times voltage matrix 69. Thereafter, the micro-processor 8 of said node computer 6 determines the values of $I_1$-$I_4$ of current matrix 67 by combining the inverse impedance matrix $Z^{-1}$ 52' and the voltage matrix 69 utilizing matrix algebra techniques in a manner known in the art. The thus-determined values of $I_1$-$I_4$ of current matrix 67 represent the final charge density or current $I_{f1}$-$I_{f4}$ in cells 56-1-56-4, respectively, of discretized mesh 58.

In practice, the direct simulation technique described above is desirably utilized for determining the charge densities or currents flowing in all the cells 56 of the discretized meshes of a single layer of a device in a single matrix operation. To this end, an inverse impedance matrix $(Z^{-1})$ for all of the cells of the discretized meshes of a single layer of the device are combined (utilizing matrix algebra techniques) with the initial potentials or voltages $V_i$ determined to exist in each cell of said discretized mesh in response to the application of an exemplary bias in order to determine the final charge densities or currents $I_f$ in each cell of said discretized mesh.

In contrast to the direct simulation technique discussed above, the iterative solution technique iteratively determines a solution for current matrix 67 in the matrix equation shown in FIG. 7.

Each impedance matrix Z utilized to determine final potentials or currents $I_f$ by the iterative solution technique can either be a method of moments matrix or a compressed (pre-conditioned) version of the method of moments matrix determined by one or more of the following methods: a fast multipole technique; a QR decomposition technique; a fast Fourier transform technique; or some combination of two or more of said techniques.

To solve for the values $I_f$ of current matrix 67 utilizing the iterative solution technique, a "guess and improve" approach is utilized. Using this approach, each node computer 6 utilizes initial guesses $I_i$ of the final charge densities or currents $I_f$ of current matrix 67, wherein said initial guesses $I_i$ are supplied by layout computer 4. Thereafter, utilizing well-known matrix algebra techniques, each node computer 6 combines the current matrix 67 stored in the memory of said node computer with the impedance matrix 52 stored in the memory of said node computer to determine new potentials or voltages $V_n$ for the voltage matrix 69 stored in the memory of said node computer and returns these new potentials or voltages $V_n$ to layout computer 4.

If layout computer 4 determines that the new potentials or voltage $V_n$ returned by each node computer 6 either do not match or are not within an acceptable tolerance of the initial potentials or voltages $V_i$ estimated to exist in the cells 56 of the corresponding discretized mesh 58 that was utilized to derive the impedance matrix 52 stored in the memory 10 of said node computer 6, layout computer 4 guesses or estimates new charge densities or currents $I_e$ and dispatches these values of $I_e$ to the node computer 6 for inclusion in the current matrix 67 stored in memory 10 of said node computer 6. Node computer 6 then utilizes these new estimated values of I, included in current matrix 67 and the impedance matrix 52 previously dispatched to said node computer 6 to determine new values $V_n$ for voltage matrix 69 which node computer 6 returns to layout computer 4 for determination of whether these new values of $V_n$ either match or are within acceptable tolerances of the initial potentials or voltages $V_i$ estimated to exist in the cells 56 of the corresponding discretized mesh 52 that was utilized to the impedance matrix 52 stored in the memory 10 of said node computer.

The process of layout computer 4 estimating or guessing for each node computer new charge densities or currents $I_e$; dispatching the new estimated charge densities or currents I, to said node computer; said node computer determining from said new estimated charge densities or currents $I_e$ and the impedance matrix previously dispatched to said node computer 6, new potentials or voltages $V_n$ which are returned to layout computer 4 for comparison to the initial potentials or voltages $V_i$ estimated to exist in the cells 56 of the corresponding discretized mesh 52 continues until the new potentials or voltages $V_n$ returned to the layout computer 4 converge to either be equal to or to be within acceptable tolerances of the initials, potentials or voltages $V_i$ estimated for each discretized mesh cell 56 that was utilized to derive the impedance matrix 52 that said node computer utilized each time to determine the new potentials or voltages $V_n$ from the new estimated charge densities or currents $I_e$ supplied by layout computer 4.

For each iteration of the iterative solution technique, new estimated charge densities or currents $I_e$ are provided by the layout computer 4 to appropriate node computers 6. Similarly, for each iteration of the iterative solution technique, new potential or voltage values $V_n$ are compared by layout computer 4 to the initial potential or voltage values $V_i$ of the cells 56 of the discretized mesh 58 utilized to derive the impedance matrix 52 that the node computer 6 utilized to determine the new potentials or voltages $V_n$.

For example, new potentials or voltages $V_{n1}$-$V_{n4}$ of voltage matrix 69 determined by node computer 6 are returned to layout computer 4 for comparison to the initial potentials or voltages $V_{i1}$-$V_{i4}$ for cells 56-1-56-4 utilized to derive impedance matrix 52. In the event of a suitable match, the iterative solution technique terminates. However, if layout computer 4 determines that a suitable match does not exist, layout computer 4 provides to node computer 6 new guesses or estimates of the charge densities or currents $I_{e1}$-$I_{e4}$ to be included in current matrix 67 which node computer 6 multiplies by the impedance matrix 52 (utilizing suitable matrix algebra) to obtain new potentials or voltages of $V_{n1}$-$V_{n4}$ for voltage matrix 69 which are then supplied to layout computer 4 for comparison with the initial potentials or voltages of $V_{i1}$-$V_{i4}$ utilized to derive impedance matrix 52. This process can continue until layout computer 4 determines that suitable new potentials or voltages $V_{n1}$-$V_{n4}$ have been returned by each node computer 6. Since layout computer 4 provided the new estimates for charge densities or currents $I_{e1}$-$I_{e4}$ that resulted in node computer 6 returning the suitable new potentials or voltages $V_{n1}$-$V_{n4}$, layout computer 4 can deem said new estimates for charge densities or currents $I_{e1}$-$I_{e4}$ to be the final or actual charge densities or currents $I_{f1}$-$I_{f4}$ flowing in cells 56-1-56-4 of discretized mesh.

At a suitable time after layout computer 4 has determined the final charge densities or currents $I_f$ estimated (either via the direct simulation technique or the iterative solution technique) to exist in the cells of the discretized mesh that was utilized to derive the impedance matrix utilized by a node computer to determine said final charge densities or currents $I_f$, layout computer 4 can assemble all of the final charge densities or currents $I_f$ in a manner whereupon each discretized mesh cell 56 has associated therewith an initial potential or voltage $V_i$ and a final charge density or current $I_f$ (determined either via the direct solution technique or the iterative solution technique). Utilizing the initial potential or voltage $V_i$ and the final charge density or current $I_f$ determined for each discretized mesh cell 56 of each layer of device 24, layout computer 4 can, in a manner known in the art, determine the performance of device 24, e.g., speed of operation, lack of cross-talk between conductors, lack of interfering electromagnetic effects between conductors, and the like.

The method of electronic design automation will now be described with specific reference to the flow chart shown in FIGS. 9A-9D, and with ongoing reference to FIGS. 6B and 6C. In the flow chart, the method initially advances from a start step 70 to a step 72 wherein a discretized mesh of the conducting material, e.g., like conducting material 34 in each layer, e.g., like layer 32, of a multi-layer model of a device, e.g., like device 24, is determined and stored in a memory 10 of layout computer 4.

The method then advances to step 74 wherein for each discretized mesh a corresponding impedance matrix, e.g., like impedance matrix 52, is determined. Each cell 54 of each impedance matrix 52 includes an impedance value $Z_{ij}$ which is based on an initial potential or voltage $V_i$ induced in a cell i of the corresponding discretized mesh due to an initial charge density or current flowing in cell j of said discretized mesh in response to the application of an exemplary electrical bias to said discretized mesh.

The method then advances to step 76 wherein layout computer 4 dispatches to each node computer on a network, e.g., like electronic communications network 2, a unique subset of the cells of the impedance matrices determined in step 74. For example, each node computer can receive all or some unique portion of the cells of a single impedance matrix.

The method then advances to step 78, wherein a decision is made whether the node computers 6 will utilize the direct solution technique or the iterative solution technique to solve for the final charge densities or currents $I_f$ in the cells of the discretized mesh utilized to derive the impedance matrix dispatched to said node computer. If, in step 78, it is determined that the node computers will utilize the direct simulation technique, the method advances to steps 80, 82, and 100. On the other hand, if it is determined that the node computers 6 will utilize the iterative solution technique, the method advances to steps 88-100.

Assuming that node computers 6 will utilize the direct stimulation technique, the method advances to step 80 wherein the initial potential or voltage $V_i$ induced in the cells 56 of the discretized meshes, e.g., like discretized mesh 58, are dispatched to the node computers on the network. The initial potentials or voltages $V_i$ dispatched to each node computer correspond to the initial potentials or voltages $V_i$ determined to exist in the cells of the discretized mesh that was utilized to derive the impedance matrix that was also sent to the same node computer.

For example, the potentials or voltages $V_{i1}$-$V_{i4}$ determined for cells 56-1-56-4, respectively, are dispatched to the same node computer as impedance matrix 52 for inclusion in a voltage matrix 69, wherein these same initial potentials and voltages $V_{i1}$-$V_{i4}$ were also utilized to derive said impedance matrix 52.

At a suitable time after each node computer 6 has received an impedance matrix, like impedance matrix 52, and has formed a corresponding voltage matrix, like voltage matrix 69, from the values of $V_{i1}$-$V_{i4}$ provided to said node computer 6 by layout computer 4, said node computer 6 determines the final charge densities or currents $I_{f1}$-$I_{f4}$ of current matrix 67 by multiplying the inverse of the impedance matrix, i.e., like inverse matrix 52', by the corresponding voltage matrix 69 in a manner known in the art. Thereafter, said node computer 6 returns these final charge densities or currents $I_{f1}$-$I_{f4}$ from current matrix 67 to layout computer 4 via network 2. In a similar manner, each other node computer 6 returns the final charge densities or currents $I_f$ determined thereby to layout computer 4.

The method then advances to step 82, wherein the final charge densities or currents $I_f$ are received by layout computer 4 from all of the node computers 6 via the network 2. The final charge densities or currents $I_f$ received from each node computer 6 are the final or actual charge densities or currents $I_f$ that exists in each cell of the corresponding discretized mesh due to the initial potentials or voltages $V_i$ and initial charge densities or currents $I_i$ induced in all of the cells of said discretized mesh in step 74. For example, the final charge density or current of $I_{f1}$ determined for cell 56-1 of discretized mesh 58 is due to the effects of all of the initial potentials or voltages $V_{i1}$-$V_{i4}$ and the initial charge densities or currents $I_{i1}$-$I_{i4}$ determined to exist in all of the cells 56-1-56-4 of discretized mesh 58.

Thereafter, the method advances to stop step 100.

Returning to step 78, on the other hand, if the node computers 6 will utilize the iterative solution technique, the method advances from step 78 to step 88.

In step 88, for each discretized mesh, like discretized mesh 58, an estimate or guess is made by layout computer 4 of the charge density or current $I_e$ that exist on or in each cell of said discretized mesh due to the combined effects of the initial potentials or voltages $V_i$ and initial charge densities or currents $I_i$ determined to exist in all of the cells of said discretized mesh due to the application of the exemplary bias to said discretized mesh. The estimated charge densities or currents I, determined by layout computer 4 for each discretized mesh are provided to the node computer 6 that received the impedance matrix, like impedance matrix 52, that was derived from the initial potentials or voltages $V_i$ and initial charge densities or currents $I_i$ induced in the cells of said discretized mesh. The estimated charge densities or currents I, of step 88 are input into the corresponding current matrix 67 of said node computer 6.

The method then advances to step 90 where each impedance matrix, like impedance matrix 52, is combined with its corresponding current matrix, like current matrix 67, utilizing well-known matrix algebra techniques to determine the corresponding voltage matrix, like voltage matrix 69, which includes new potential or voltage values $V_n$ estimated to exist in the cells 56-1-56-4 of the discretized mesh 58 that was utilized to derive said impedance matrix.

The method then advances to step 92, wherein the new estimated potential or voltage values $V_n$ included in the voltage matrix in step 90 are returned to layout computer 4 for comparison to the initial potentials or voltages $V_i$ induced in the cells of the discretized mesh in step 74, to determine if said new estimated potential or voltage values $V_n$ are the same as (equal to) or are within acceptable tolerances of the initial potentials or voltages $V_i$ induced in the cells 56 of the discretized mesh 58 in step 74.

For each voltage matrix 69 where the comparison of step 92 evaluates to true or satisfied (i.e., the new estimated potentials or voltages $V_n$ included in voltage matrix 69 are the same as or are within acceptable tolerances of the initial potentials or voltages $V_i$ induced in the cells of the discretized mesh in step 74), the method advances to stop step 100.

On the other hand, for each voltage matrix where the comparison of step 92 evaluates to false or not satisfied (i.e., the new estimated potentials or voltages $V_n$ included in voltage matrix 69 are not the same or are not within acceptable tolerances of the initial potentials or voltages $V_i$ induced of the cells of the discretized mesh), the method advances to step 94.

In step 94, for each voltage matrix where the comparison of step 92 evaluates to false, new estimates of the charge densities or currents $I_e$ are made by layout computer 4 and are dispatched to said node computer for inclusion in the current matrix of said node computer. The method then advances to step 96.

In step 96, for each node computer having a current matrix that received new estimates of charge densities or currents $I_e$ in step 94, said current matrix is combined by said node computer with the impedance matrix 52 previously received by said node computer (using matrix algebra techniques) to determine new potentials or voltages $V_n$ for the corresponding voltage matrix. These new potentials or voltages $V_n$ are returned by said node computer to layout computer 4.

The method then returns to step 92 where the new potentials or voltages $V_n$ of each voltage matrix determined in step 96 are compared by the layout computer 4 to the initial potentials or voltages $V_i$ induced in the cells of the corresponding discretized mesh that as utilized in step 74 to derive the impedance matrix that was utilized to determine said new potentials or voltages $V_n$.

For each voltage matrix determined by a node computer where the comparison in step 92 evaluates to false, layout computer 4 in step 94 estimates (guesses) new charge densities or currents $I_e$ to be included in the current matrix that is combined with the impedance matrix previously received by said node computer to determine new potentials or voltages $V_n$ for said voltage matrix, which new potentials or voltages $V_n$ are returned to layout computer 4 for comparison in step 92.

The new estimated charge densities or currents $I_e$ to be included in one or more current matrices 67 in each iteration of step 94 is desirably done in a manner which, over a number of iterations of steps 94 and 96, causes the comparison of step 92 to trend or converge toward an evaluation of true or satisfied. Thereafter, for each voltage matrix where the comparison in step 92 evaluates to true, the estimated charge densities or currents $I_e$ of the corresponding current matrix utilized to determine said voltage matrix are deemed by layout computer 4 to be the final charge densities or currents $I_f$ that exist in appropriate discretized mesh cells. For example, each cell 56 of discretized mesh 58 will include the initial potential or voltage $V_i$ determined to be induced in said cell in step 74 and the final charge density or current $I_f$ determined to exist in said cell in steps 94 and 96, which final charge density or current $I_f$ corresponds to the total charge density or current induced in said cell by all of the initial potentials or voltages $V_i$ and all of the initial charge densities or currents $I_i$ of said discretized mesh 58.

Once the comparison of step 94 evaluates true for each voltage matrix determined in step 90, the method advances to stop step 100.

Once the final charge density or current $I_f$ has been determined, either via the direct simulation technique or the iterative solution technique, for each cell of each discretized mesh of each layer of a device under consideration, layout computer 4 can model the electrical and/or electromagnetic performance of the device based on the initial potentials or voltages $V_i$ induced in each cell in step 74 and the final charge density or current $I_f$ determined for said cell utilizing either the direct simulation technique or the iterative solution technique.

Each node computer 6 can utilize either the direct simulation technique discussed above or the iterative solution technique discussed above. The decision to use either technique can be made either by the node computer itself or under the control of layout computer 4. For example, when a node computer 6 receives a relatively small impedance matrix 52 from layout computer 4, the direct simulation technique can be utilized. On the other hand, when the node computer 6 receives a relatively large impedance matrix 52 from layout computer 4, the iterative solution technique can be utilized.

Moreover, it is envisioned that different node computers can use different techniques. For example, it is envisioned that one or more node computers 6 can use the direct simulation technique, whereas one or more other node computers 6 can use the iterative solution technique.

Regardless of how each node computer 6 determines the final charge density or current $I_f$ that exists in each cell of the discretized mesh utilized to derive the impedance matrix dispatched to said node computer 6, layout computer 4 includes said final charge densities or currents $I_f$ in appropriate cells of said discretized mesh along with the initial potentials or voltages $V_i$ determined for said cells of said discretized mesh and, thereafter, can model the electrical and/or electromagnetic performance of the device 2 in a manner known in the art.

The invention has been described with reference to the preferred embodiments. Obvious modifications and alterations will occur to others upon reading and understanding the preceding detailed description. For example, the foregoing examples are for the purpose of illustration and are not to be construed in any way as limiting the invention. It is intended that the invention be construed as including all such modifications and alterations insofar as they come within the scope of the appended claims or the equivalents thereof.

The invention claimed is:

1. A method of electronic design automation implemented by a processor of a computer, the method comprising:
   (a) the processor determining for each of a plurality of layers of an analytical or computer model of a device residing in a memory accessible by the processor a discretized mesh of current conducting material of said layer;
   (b) the processor storing the discretized meshes determined in step (a) in said memory;
   (c) the processor determining for each discretized mesh stored in step (b) a corresponding or related impedance matrix having cells, wherein each cell of each impedance matrix includes an impedance value $Z_{ij}$ which is based on a potential or voltage ($V_i$) induced in a cell i of the corresponding discretized mesh due to an initial charge density or current ($I_j$) determined to exist in a cell j of the corresponding discretized mesh in response to an exemplary bias applied to said discretized mesh;
   (d) the processor dispatching to each of a plurality of node computers on an electronic communications network a unique subset of the cells of the impedance matrices including the impedance values determined in step (c); and
   (e) responsive to the dispatching in step (d) to each node computer, the processor either:
      (1) receiving from said node computer via the electronic communications network final charge densities or currents estimated to exist on a subset of the cells of at least one discretized mesh; or (2) determining in cooperation with said node computer via the electronic communications network final charge densities or currents estimated to exist on a subset of the cells of at least one discretized mesh.

2. The method of claim 1, wherein, for each cell of each impedance matrix, $Z_{ij}$=voltage produced at cell i due to the unit current/charge density on cell j, with the voltages and currents/charge densities of all other cells set to zero, where i=1 ... n; j=1 ... n; and n=the number of cells.

3. The method of claim 1, wherein all of the cells of the impedance matrices determined in step (c) are dispatched to the plurality of node computers in step (d).

4. The method of claim 1, wherein, in step (d), each node computer is dispatched a subset of the cells of one impedance matrix, wherein the subset of the cells of said one impedance matrix includes all or a portion of said cells of said one impedance matrix.

5. The method of claim 1, wherein the final charge densities or currents estimated to exist on the subset of the cells of the at least one discretized mesh in step (e)(1) or step (e)(2) for each node computer is determined based on the unique subset of impedance matrix cells dispatched to said node computer in step (d).

6. The method of claim 1, wherein step (d) includes dispatching two unique, non-overlapping sets of cells of one impedance matrix to two different node computers.

7. The method of claim 6, wherein the two unique sets of cells of the one impedance matrix includes two different rows or columns of said one impedance matrix.

8. The method of claim 1, further including the processor dispatching to each of the plurality of node computers on the electronic communications network the voltage induced in each cell i of the corresponding discretized mesh related to the impedance values ($Z_{ij}$) included in the cells of the corresponding impedance matrix dispatched to said node computer.

9. The method of claim 1, further including:
(f) the processor dispatching to each node computer via the electronic communications network a set of charge densities or currents estimated by the processor to exist in the cells of corresponding discretized mesh from which the impedance values of the impedance matrix cells dispatched to said node computer in step (d) were determined; and
(g) the processor comparing potentials or voltages returned by the node computers that are based on the set of estimated charge densities or currents dispatched to said node computers in step (f) and the impedance matrix cells dispatched to said node computers in step (d) to the potentials or voltages determined to be induced in the discretized mesh cells in step (c), wherein each returned potential or voltage is related to a potential or voltage of one discretized mesh cell, and each returned potential or voltage is compared to the potential or voltage determined to be induced in the same discretized mesh cell in step (c).

10. The method of claim 9, further including the processor deeming the sets of estimated charge densities or currents dispatched in step (f) to be the final charge densities or currents in step (e)(2) in response to the processor in step (g) determining that each returned potential or voltage is either equal to or is within a predetermined value of the potential or voltage determined to be induced in the same discretized mesh cell in step (c).

11. The method of claim 9, further including the processor repeating steps (f) and (g) with at least one different set of estimated charge densities or currents substituted for at least one set of estimated charge densities or currents utilized in a prior iteration of step (f) in response to the processor in a prior iteration of step (g) determining that each returned potential or voltage is not equal to or is not within a predetermined value of the potential or voltage determined to be induced in the same discretized mesh cell in step (c).

12. The method of claim 11, wherein each different set of estimated charge densities or currents causes the returned potentials or voltages to converge toward the potentials or voltages determined to be induced in the cells of the discretized meshes in step (c).

13. The method of claim 1, wherein the device is an integrated circuit, an integrated circuit package, a printed circuit board, an electrical connector, an aircraft, an automobile, or an antenna.

14. The method of claim 1, wherein the impedance matrices determined in step (c) include at least one compressed matrix determined via a fast multipole technique; a QR decomposition technique; a fast Fourier transform technique; or some combination of two or more of said techniques.

15. A method of electronic design automation implemented by a processor of a computer, the method comprising:
(a) the processor determining discretized meshes of current conducting materials of layers of an analytical or computer model of a device residing in a memory accessible by the processor, wherein each discretized mesh corresponds to the current conducting material on one layer of the model;
(b) the processor determining for each discretized mesh a corresponding or related impedance matrix having cells, wherein each impedance matrix cell includes an impedance value $Z_{ij}$ which is based on a potential or voltage ($V_i$) induced in a cell i of the corresponding discretized mesh due to an initial current ($I_j$) determined to be flowing in a cell j of said corresponding discretized mesh in response to the application of an exemplary bias to said corresponding discretized mesh;
(c) the processor dispatching to node computers via an electronic communications network a subset of the impedance matrix cells, including the impedance values, of the impedance matrices determined in step (b); and
(d) in response to the dispatch in step (c) to each node computer the processor either:
(1) receiving from said node computer via the electronic communications network final charge densities or currents estimated by said node computer to exist on a subset of the cells of the discretized meshes, or
(2) determining in cooperation with said node computer via the electronic communications network final charge densities or currents that exist on a subset of the cells of the discretized meshes.

16. The method of claim 15, wherein:
the subset of the impedance matrix cells dispatched in step (c) includes all of the cells of all of the impedance matrices, wherein each node computer in step (c) is dispatched a unique set of the impedance matrix cells that is non-overlapping with any other set of impedance matrix cells dispatched to any other node computer; and
the subset of the cells of the discretized meshes in either step (d)(1) or step (d)(2) includes all or a portion of the cells of one discretized mesh from which the impedance values of the impedance matrix cells dispatched to said node computer in step (c) were determined.

17. The method of claim 15, further including dispatching to each node computer the voltages ($V_i$) induced in the discretized mesh cells corresponding to the impedance values $Z_{ij}$ included in the impedance matrix cells dispatched to said node computer in step (c).

18. The method of claim 15, further including:

(e) the processor dispatching to each node computer a set of charge densities or currents estimated to exist in the cells of the discretized mesh from which the impedance values of the impedance matrix cells that were also dispatched to said node computer in step (c) were determined; and (f) the processor comparing voltages returned by the node computers that are based on the set of estimated currents dispatched to said node computers in step (e) and the impedance matrix cells dispatched to said node computers in step (c) to the voltages determined to be induced in the discretized mesh cells in step (b), wherein each returned voltage is related to a voltage of one discretized mesh cell, and each returned voltage is compared to the voltage determined to be induced in the same discretized mesh cell in step (b).

19. The method of claim 18, further including at least one of the following:

in response to the processor in step (f) determining that each returned potential or voltage is either equal to or is within a predetermined value of the potential or voltage determined to be induced in the same discretized mesh cell in step (b), the processor deeming the sets of estimated charge densities or currents dispatched in step (e) to be the final charge densities or currents in step (d)(2); or in response to the processor in step (f) determining that each returned potential or voltage is not equal to or is not within a predetermined value of the potential or voltage determined to be induced in the same discretized mesh cell in step (b), the processor repeating steps (e) and (f) with at least one different set of estimated currents substituted for at least one set of estimated currents utilized in a prior iteration of step (e)

20. The method of claim 15, wherein at least one impedance matrix determined in step (b) is a compressed matrix determined via a fast multipole technique; a QR decomposition technique; a fast Fourier transform technique; or some combination of two or more of said techniques.

* * * * *